US008690054B1

(12) United States Patent
Cummins et al.

(10) Patent No.: US 8,690,054 B1
(45) Date of Patent: Apr. 8, 2014

(54) SYSTEM AND METHOD FOR CHIP-ENABLED CARD TRANSACTION PROCESSING AND ALERT COMMUNICATION

(71) Applicant: The Toronto-Dominion Bank, Toronto (CA)

(72) Inventors: Michael D. Cummins, Pickering (CA); Prabaharan Sivashanmugam, Farmington Hills, MI (US); Lauren Van Heerden, Bedford, MA (US); Gunalan Nadarajah, Richmond Hill (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 14/068,504

(22) Filed: Oct. 31, 2013

Related U.S. Application Data

(60) Provisional application No. 61/828,243, filed on May 29, 2013.

(51) Int. Cl.
*G06K 19/00* (2006.01)
*G06Q 30/00* (2012.01)

(52) U.S. Cl.
USPC .......................... 235/379; 235/492; 705/14.3

(58) Field of Classification Search
USPC .......................... 235/379, 380, 492; 705/14.3
See application file for complete search history.

(56) References Cited

U.S. PATENT DOCUMENTS

| 5,177,342 | A | 1/1993 | Adams |
| 5,793,027 | A | 8/1998 | Baik |
| 7,587,756 | B2 | 9/2009 | Peart et al. |
| 7,765,162 | B2 | 7/2010 | Binder et al. |
| 8,078,538 | B1 | 12/2011 | Buch et al. |
| 8,196,131 | B1 | 6/2012 | von Behren et al. |
| 8,256,667 | B2 | 9/2012 | Poznansky et al. |
| 8,276,814 | B1 | 10/2012 | Davis |

(Continued)

FOREIGN PATENT DOCUMENTS

| WO | 9710560 A1 | 3/1997 |
| WO | 9825220 A1 | 6/1998 |
| WO | 03079258 A1 | 9/2003 |
| WO | 2006012538 A2 | 2/2006 |

OTHER PUBLICATIONS

Card Acceptance Guidelines for Visa Merchants; http://usa.visa.com/download/merchants/card-acceptance-guidelines-for-visa-merchants.pdf; 2011.

(Continued)

*Primary Examiner* — Daniel Hess
(74) *Attorney, Agent, or Firm* — Gowling Lafleur Henderson LLP

(57) ABSTRACT

A system, method and computer program product is capable of proactive assessment of transactions and communication of alerts based on pre-set rules to increase transaction integrity and mitigate fraud. Unauthorized transactions may be stopped before processing through an account to enhance the security of transactions and decrease fraudulent transactions without the account holder seeing a negative transaction in their account. Chip-enabled cards may be configured to alert account holders of transactions prior to being processed through an account based on pre-set rules stored on the chip or in a remote data store. The transaction can be stopped until the account holder authorizes the transaction based on the alert. The alert can be sent through the merchant system or wirelessly from the chip-enabled card.

14 Claims, 2 Drawing Sheets

(56) References Cited

U.S. PATENT DOCUMENTS

| | | |
|---|---|---|
| 8,341,084 B2 | 12/2012 | Cowen |
| 8,342,396 B2 | 1/2013 | Couper et al. |
| 8,353,054 B2 | 1/2013 | Nguyen et al. |
| 8,360,332 B2 | 1/2013 | Poidomani et al. |
| 2004/0030659 A1 | 2/2004 | Gueh |
| 2006/0059110 A1 | 3/2006 | Madhok et al. |
| 2007/0119917 A1* | 5/2007 | Tomikawa et al. ............ 235/380 |
| 2010/0057614 A1 | 3/2010 | Rainey et al. |
| 2010/0197383 A1 | 8/2010 | Rader et al. |
| 2010/0198728 A1 | 8/2010 | Aabye et al. |
| 2011/0166997 A1 | 7/2011 | Dixon et al. |
| 2012/0047072 A1 | 2/2012 | Larkin |
| 2012/0205443 A1 | 8/2012 | Routhenstein et al. |
| 2012/0290420 A1 | 11/2012 | Close |
| 2012/0323660 A1 | 12/2012 | Postrel |
| 2012/0323717 A1 | 12/2012 | Kirsch |
| 2012/0330839 A1 | 12/2012 | Kavanagh et al. |
| 2013/0041823 A1 | 2/2013 | Wagner et al. |
| 2013/0124346 A1 | 5/2013 | Baldwin et al. |

OTHER PUBLICATIONS

MasterCard Rules; www.mastercard.com/us/.../pdf/BM-Entire_Manual_public.pdf; Jun. 14, 2013.

EMV Integrated Circuit Card Specifications for Payment Systems; Book 3; Application Specification; Version 4.3; Nov. 2011.

Smart Card Evolution; by Katherine M. Shelfer and J. Drew Procaccino; Jul. 2012 / vol. 45, No. 7.

Visa Announces Plans to Accelerate Chip Migration and Adoption of Mobile Payments; http://coporate.visa.com/newsroom/press-releases/press1142.jsp; Aug. 9, 2011.

EMV Chip Card Technology, American Express; Apr. 2013.

* cited by examiner

SYSTEM AND METHOD FOR CHIP-ENABLED CARD TRANSACTION PROCESSING AND ALERT COMMUNICATION

FIELD

The present matter relates to a system and method for communicating an alert to an account holder relating to a purchase transaction using an integrated circuit-(IC-) or a chip-enabled payment smartcard.

BACKGROUND

Chip-enabled payment smartcards, such as chip and PIN credit cards, and compliant terminals for communicating with same have been widely introduced to provide enhanced security for processing credit and debit payments and automated teller transactions. One common standard for such cards and terminals, such as point of sale (POS) terminals and automated teller machines (ATMs), is the EMV interoperability standard for authenticating transactions (for example, the EMV® Integrated Circuit Card Specifications of EMVCo, LLC available at www.emvco.com). Chip-enabled cards (sometimes referenced as integrated circuit cards or ICCs) may be provisioned with rules, such as at the time of card issuance or later, such as via issuer scripts, for performing card action analysis to determining whether to authorize or decline a particular transaction. During authorization processing for a particular transaction where a card is presented to a compliant terminal, the card performs transaction processing (card action analysis), for example, using transaction data obtained from the terminal. The chip-enabled card may approve a transaction off-line (i.e. without requiring access on-line to a card network system), force on-line authorization via the card network or offline decline authorization.

Often a cardholder verification mechanism (CVM) employed for a transaction is the supply of a personal identification number (PIN) such as a 4 or 6 digit number keyed into the terminal. Other CVMs include a cardholder signature whereby the cardholder signs a receipt.

Card transactions are liable to fraud and misuse. From time to time, cards and PINS are obtained by unauthorized persons. Account holders, who may be ultimately responsible to pay the card issuer for transactions made using the chip-enabled card or who may be inconvenienced if their card is used without authorization, may desire greater control over card use. There may be occasions when additional authorization mechanisms may be desired.

BRIEF DESCRIPTION OF THE DRAWINGS

In order that the subject matter may be readily understood, embodiments are illustrated by way of examples in the accompanying drawings, in which.

For convenience, like numerals in the description refer to like structures in the drawings.

DETAILED DESCRIPTION

A system, method and computer program product is capable of proactive assessment of transactions and communication of alerts based on pre-set rules to increase transaction integrity and mitigate fraud. Unauthorized transactions may be stopped before processing through an account to enhance the security of transactions and decrease fraudulent transactions without the account holder seeing a negative transaction in their account.

Chip-enabled cards may be configured to alert account holders of transactions prior to being processed through an account based on pre-set rules stored on the chip or in a remote data store. The transaction can also be stopped until the account holder authorizes the transaction based on the alert. The alert can be sent through the merchant system (e.g. via a merchant POS terminal) or wirelessly from the chip once "energized".

Figure 1:
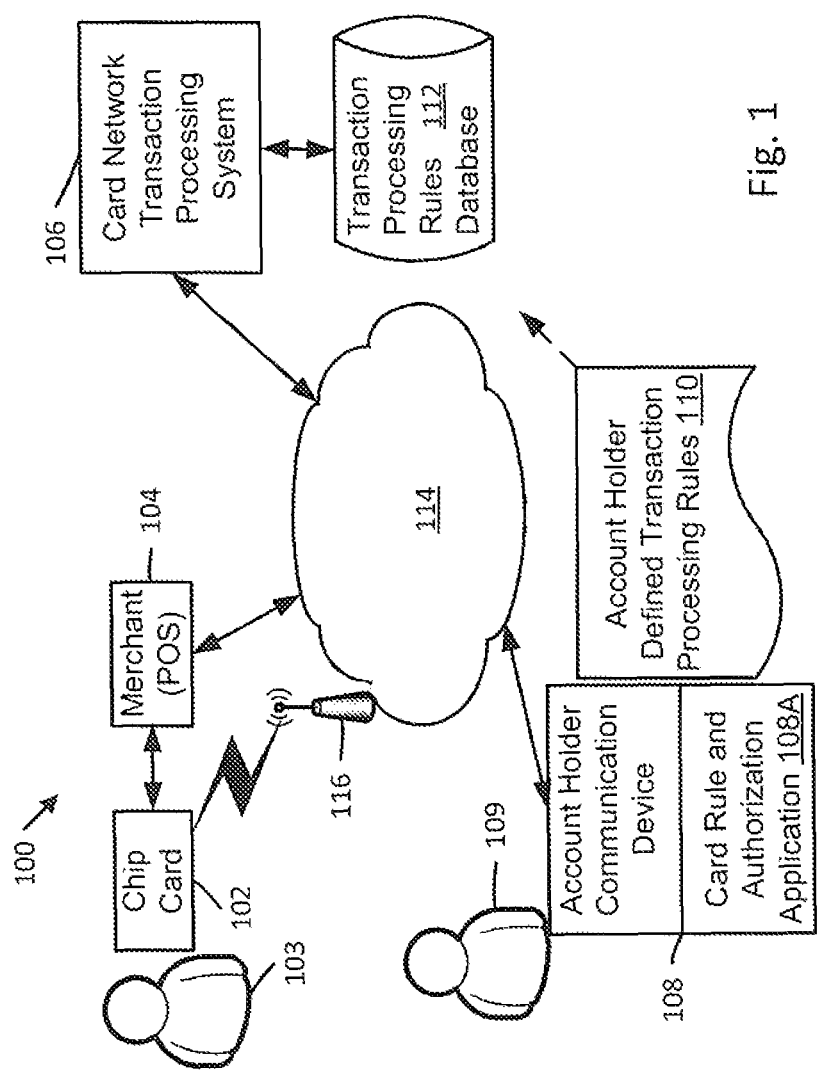
FIG. 1 is a simplified block diagram of an example embodiment of a communication network for performing transaction processing and alerts by a chip-enabled card in accordance with an example.

FIG. 1 is a block diagram of an example embodiment of a communication system 100 for conducting purchase transactions in accordance with an example. Purchase transactions may be conducted using a chip-enabled card 102 presented by a card holder 103 to a merchant POS terminal 104 that is compliant with the chip-enabled card 102. The chip-enabled card 102 may be issued by a card issuer (not shown) for processing in a card network transaction processing system 106 that may participate in the authorization and/or other processing associated with the transaction and card. For convenience a single card network transaction processing system 106 is shown though separate systems may be employed such as for issuing cards, authorizing transactions and/or updating data stored to chip-enable cards such as chip-enable card 102, as further described below. Purchase transactions may be conducted at a plurality of merchant locations but only a single is shown for brevity.

Also shown is an account holder communication device 108, which may be a smartphone, POTS telephone, tablet, laptop, desktop or other communication device capable of receiving and responding to a transaction alert triggered by chip-enable card 102. Again for convenience, a single account holder communication device 108 is shown but the account holder may have more than one communication device. The account holder communication device 108 may be operated by an account holder 109, which individual may be the same as card holder 103 as described further herein below. Account holder communication device 108 may also be configured to receive input from the account holder 109 to define and communicate account holder defined transaction processing rules 110 such as for storage in transaction processing rules database 112 of card network transaction processing system 106. Transaction processing rules database 112 may also store transaction processing rules configured for chip-enabled card 102 by the card issuer (not shown) such as a bank, credit union or other FI and/or the operator of the card network (e.g. VISA™, MasterCard™, Interac™, etc.). In some examples, the transaction processing rules, whether those rules are defined by the card issuer, operator of the card network, the account holder or any subset thereof are stored to chip-enabled card 102. The transaction processing rules are for executing by the chip-enabled card 102, such as by matching against respective transaction data, for authorizing the transaction as described further below. The rules may include instructions/configuration for communicating an alert to the account holder communication device for authorizing the transaction. The rules may be uploaded to the chip during chip or card production or distribution processes. The rules can be modified by respective parties through updates to the card such as in accordance with chip-enabled card protocols and standards (e.g. rules can be uploaded to the chip during a next point of sale terminal, at an issue location, through an issuer's ATM network, account customer's mobile device with NFC.

Bluetooth, or other communication network.) The rules may be stored in a remote data store and downloaded or otherwise accessed in real time during transaction processing.

The rules may code notification and security preferences that are responsive to various factors including any or all of the following:
- Transaction amount
- Merchants/Merchant type
- Timing (date or time of transaction)
- Location/geographic area
- Currency
- Type of transactions (in person, automated, online, mobile, offline, phone, pre-authorized, etc.)
- Account being accessed (e.g. debit cards access multiple accounts)

A rule example may be "Send alert if transaction amount is >$nnn" or "Send alert if merchant country is not the United States". A rule is matched when it evaluates to a true condition in view of the transaction data. Rules typically have evaluation components or conditions and action components which action is invoked if the rule is true. Other rule forms may be used Rules can be set individually at the card level or at an account level for cards that access the same account (e.g., supplementary cards, business accounts, debit account access, etc.) Card network transaction processing system 106 may prioritize rules or resolve conflicts in rules among the various parties defining same.

In some examples, card network transaction processing system 106 may store contact information (not shown) for account holder 109 such as for communicating alerts to account holder communication device 108, The contact information may include email, telephone, IM, or other information. As described further below, the account holder contact information may be provided (provisioned) to chip-enabled card 102. Card network transaction processing system 106 may provide an interface to update such information.

The various communication devices may be connected to a communication network 114 to communicate for authorization as described further. The network 114 is simplified. The network may comprise one or more private or public networks, wired or wireless infrastructure, etc. In addition to chip-enabled card 102 communicating to merchant terminal 104 in a contact or contactless manner for completing the transaction, in some examples, chip-enabled card 102 may be configured for communicating in a separate channel or manner such as via Wi-Fi (as represented by access point 116) or other wireless communication means (e.g. cellular, etc., not shown). Chip-enabled card 102 may comprise suitable antenna, and other components of a wireless communication subsystem for communicating via a wireless local area network and/or a wireless wide area network to communicate with account holder communication device 108 in a separate channel, without communicating via merchant terminal 104. Chip-enabled card 102 may perform transaction processing using the transaction processing rules, in real-time during transaction authorization and communicate with account holder communication device 108 in response to such transaction processing. The communication may be via merchant POS terminal 104 or via another communication channel such as Wi-Fi by access point 116.

Chip-enabled card 102 may be configured for contact communication (whereby the card is inserted into an interface device of the terminal 104), or contactless communication (whereby the chip-enabled card 102 and terminal 104 are brought within and maintained within a suitable proximity such that RF communication therebetween is initiated and maintained in accordance with an applicable standard (e.g. NFC standard). The configuration of the chip-enabled card 102 is not described in detail for sake of brevity and is well-known. Standards for cards with contacts may be found within ISO/IEC 7816 and standards for contactless cards within ISO/IEC 14443 as may be available from the International Standards Organization (ISO).

Chip-enabled card 102 comprises storage (e.g. EEPROM, RAM, ROM) for storing instructions and/or data in a non-transitory manner and processing capabilities (e.g. ASIC, micro-processor, etc.) for performing communications and transaction processing analysis. In some examples, chip-enabled card 102 is configured to perform in accordance with the EVM standard in addition to any features functions and capabilities described herein in relation to alerting the account holder in accordance with the transaction processing. For example, chip-enabled card 102 may comprise circuitry for Wi-Fi or other radio frequency communication to communicate the alert.

Chip-compliant merchant POS terminals are also well-known and described in similar standards. Such terminals may be adapted to provide the features, functions and capabilities described herein to facilitate alerts for authorization.

Card network transaction processing system 106 may comprise one or more computers, such as servers, comprising or connected with one or more processors (e.g. microprocessors, etc.), memory, communication subsystems, input devices (keyboard, pointing device, microphone, buttons, printers), output devices (speaker, LEDS or other lights, display screen) and/or input/output devices (touch screen enabled display devices), storage devices, etc. Instructions and/or data stored in a non-transitory medium (e.g. memory (RAM or ROM) or a storage device (e.g. hard drive, flash drive, CD ROM, DVD ROM, etc.) may configure operations of the processor(s). Other embodiments are possible such as hardware-oriented (ASIC) embodiments.

In some examples, account holder communication device 108 may comprise similar hardware components and/or software (applications, operating systems, data, etc.) typical as a user computer. Account holder communication device 108 may comprise a browser component (an application) for example, Safari™, FireFox™ or Internet Explorer™ for communicating via Web protocols. Card network transaction processing system 106 may provide a Web-based interface for defining and/or updating account holder defined transaction processing rules 110. Other interfaces may be used, such as a native or dedicated application (e.g. a card rule and authorization application 108A) for installing on a suitable account holder communication device 108. Card rule and authorization application 108A may also be used for receiving and communicating responses to alerts triggered from chip-enabled card 102. To perform the communication, chip-enabled card 102 may use account holder contact information (or other communication mechanisms/addressing) to communicate with account holder communication device 108 and/or card rule and authorization application 108A.

Communications of alerts from or initiated by chip-enabled card 102 may take various forms such as email, texts (e.g. SMS messages), instant messages (IMs), automated telephone calls, etc. The communication may comprise a link (URL or other URI) to be invoked for providing a response. There may be more than one link such as for different responses (e.g. to authorize or to decline). To complete the authorization, the response may be communicated to chip-enabled card 102, terminal 104 or both. The response may be communicated to card network transaction processing system 106 and/or account holder 109 via account holder communication device 108 for records purposes, for example.

Chip-enabled card 102 may be configured with a pre-defined message or a template It will be appreciated that the payment infrastructure is simplified. For example, not shown are connections to various financial institutions and the like. It will be appreciated that communication network 100 is simplified. For example, not shown is various network infrastructure including routers, switches, firewalls, load balancers, gateways, etc.

Figure 2:
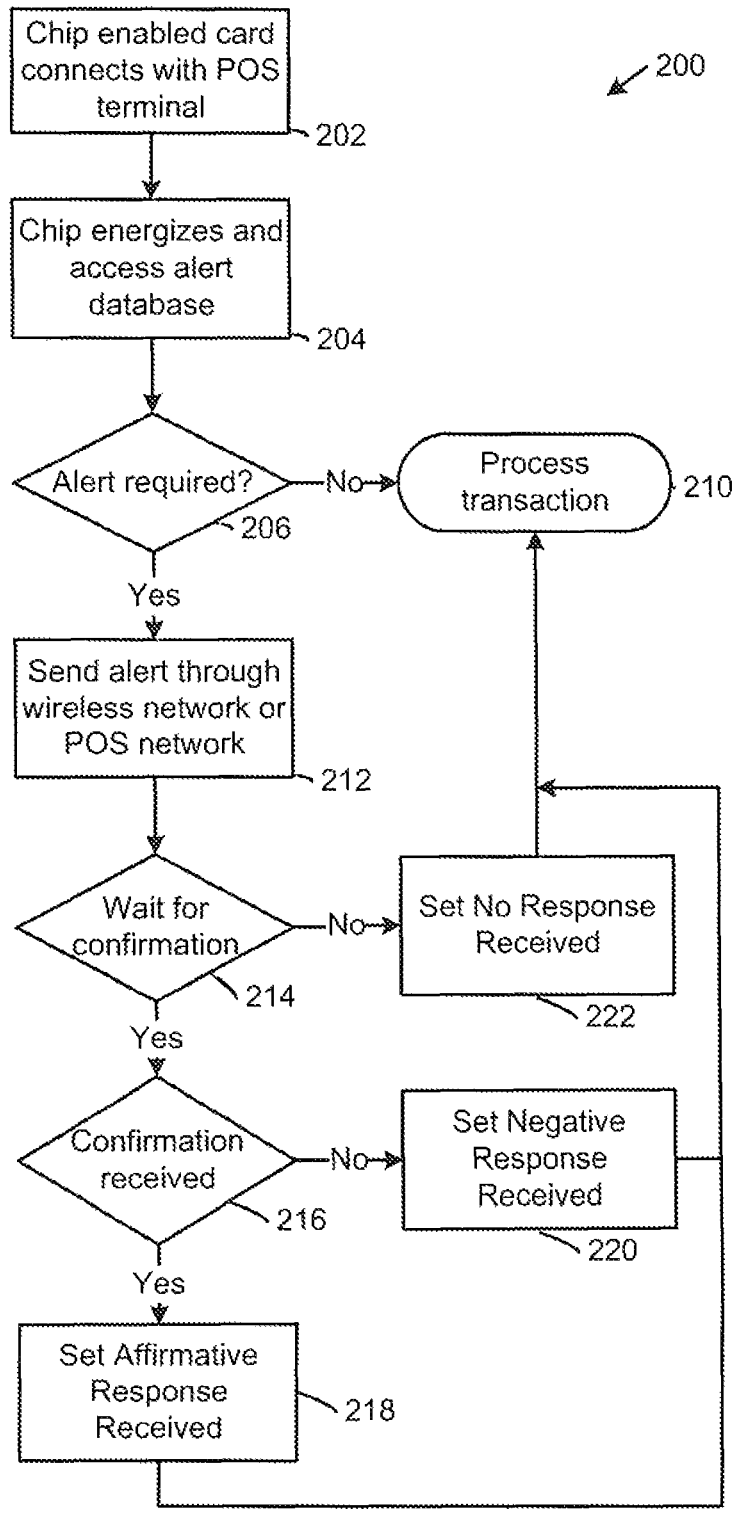
FIG. 2 is a flowchart illustrating operations for performing transaction processing and alerts by a chip-enabled card in accordance with an example.

FIG. 2 is a flowchart illustrating operations 200 for transaction processing using chip-enabled card 102 with alert communication. At 202, chip-enabled card 102 connects with merchant POS terminal 104. At 204, the chip on board chip-enabled card 102 is energized (i.e. it receives power) and accesses a store or transaction processing rules which may be stored on chip-enabled card 102 or remotely (206). The flow of actions may be performed in accordance with a standard for transaction authorization such as the EMV standard.

At 206, analysis of the transaction by evaluation of the rules may occasion the triggering of an alert. That is, an alert communicated to the account holder 109 may be required or not depending on the rules and the data of the current transaction. At least some of the data for the transaction may be provide by merchant POS terminal 104 and the chip-enabled card 102 may be configured to specify which data is to be provided. In some examples, the alert may be configured to be communicated to the card holder 103 who may be a different individual from the account holder 109. A chip-enabled card 102 may be associated to a card holder communication device (e.g. having an alert application (not shown)).

If an alert is not required, via no branch to 212, transaction processing may continue without triggering the alert. The chip-enabled card may communicate with the merchant terminal 104 and provide a transaction analysis reply indicating that the transaction may be approved offline, offline declined or to force online authorization, for example.

If an alert is required, via yes branch to 212, the alert is triggered. The alert may be communicated through the communication coupling of the chip-enabled card 102 and merchant POS terminal 104, providing a connection via network 114 for example or through a separate channel such as a wireless network (e.g. access point 116).

At 214, processing awaits a confirmation response from account holder communication device 108 (or a cardholder device if so configured). Operations flow to 216 via yes branch from 214 if a confirmation response is received. At 216, the response is evaluated and if the response is affirmative, confirming the transaction, operations flow via yes branch to 218 where an affirmative response code is set and then to 210 and processing continues.

The affirmative response may halt any further analysis by chip-enabled card 102 and occasion an offline approval or similar card analysis return code. A reason code or data may also be supplied advising of the receiving of an affirmative response to the alert. In other examples, an affirmative response is not wholly determinative and further analysis may be performed before determining whether to authorize or not (i.e. to determine the card analysis return code).

If at 216 the response received is negative (e.g. the transaction is denied in a response from the account holder communication device 108), operations flow via no branch to 220 where a negative response code is set and then to 210 and processing continues. The negative response may halt any further analysis by chip-enabled card 102 and occasion an offline decline or similar card analysis return code. A reason code or data may also be supplied advising of the of the receiving of an negative response to the alert.

If at 214, operations of chip-enabled card 102 do not receive a confirmation response, for example after waiting a pre-set amount of time for the communication, operations flow via no branch to 222 where a no response received code is set and then to 210 and processing continues. The lack of a response (lack of receiving a response) may halt any further analysis by chip-enabled card 102 and occasion an offline decline or similar card analysis return code. A reason code or data may also be supplied advising of no response received to the alert. In other examples, no response received is not wholly determinative and further analysis may be performed before determining whether to authorize or not (i.e. to determine the card analysis return code). Further processing may be performed, such as using rules on board the chip-enabled card 102 or those stored remotely.

Further processing operations among chip-enabled card 102, merchant POS terminal 104 and card network transaction processing system 106 for completing the transaction are not shown. Chip-enabled card 102 may supply a particular return code (e.g. TC, MC or ARQC within the EVM standard) or message to the terminal 104 to signal the approval offline, denial offline or requirement to seek approval online. The return message may encode reasons (account holder approval received, denial received, no reply received, etc.) for example. The EVM standard may be modified to permit such encoding, for example, using Cryptogram Information Data bits within the EVM standard.

If communication of the alert is to be performed through the merchant POS terminal 104, modifications to enable a conventional POS terminal to receive and forward the alert and response may be necessary.

In instances of transactions which occur where the card is not present (e.g., buying online, power outage, pre-authorized transactions, telephone orders, etc.) such that the chip-enabled card 102 is not able to connect to a network, or the network connection is disrupted, the transaction will proceed without the benefit of the enhanced notification and security features.

The transaction may be stopped based on preferences programmed on the chip itself: override abilities may be deployed such as mobile device authorization (e.g., customer accesses account holder communication device 108 and application 108A to authorize the transaction).

Some card accounts are associated with multiple cards for respective card holders. The second and subsequent cards are often referred to as supplementary cards, the primary card issued for the account holders. A supplementary card may be for a family member in a personal account scenario, Business accounts may also have more than one card associated with a card account.

Accounts which have multiple cards (e.g., supplementary cards, business accounts, debit account access, etc.) can have preferences set at the card level or at an overall account level for cards that access the account. Preferences may be maintained by the respective owner(s) of the account. Preferences for supplementary cards for business and personal accounts would be set by the respective owner(s) of the account, and not the card holder.

One or more embodiments have been described by way of example. It will be apparent to persons skilled in the art that a number of variations and modifications can be made. The scope of the claims should not be limited by the embodiments set forth in the examples, but should be given the broadest interpretation consistent with the description as a whole.

What is claimed is:

1. A computer-implemented method for authorizing a transaction using a chip-enabled card coupled for communication to a merchant terminal, in a contact or contactless manner, to conduct the transaction, the method comprising:

receiving transaction data via the merchant terminal for performing an analysis of the transaction;

triggering, by the chip-enabled card, an alert for communication to an account holder communication device associated with the chip-enabled card in response to the analysis of the transaction by the chip-enabled card using pre-set transaction processing rules, the alert requesting a response to confirm or deny the transaction; and processing authorization in accordance with the response or no response as received by the chip-enabled card.

2. The method of claim 1 comprising communicating the alert by the chip-enabled card to the account holder device via a separate channel from the coupling between the chip-enabled card and the merchant terminal.

3. The method of claim 2 comprising receiving the response via the separate channel.

4. The method of claim 1 including providing a card analysis return code to the merchant terminal in accordance with the authorization, wherein the card analysis return code includes data representing the response or no response as received by the chip-enabled card.

5. The method of claim 1 wherein the pre-set transaction processing rules are stored to the chip-enabled card and wherein the method comprises receiving updates to the pre-set transaction processing rules.

6. The method of claim 5 wherein at least some of the pre-set transaction processing rules are defined by an account holder associated with the chip-enabled card.

7. A computer program product comprising a non-transitory medium storing instructions for configuring at least one processor of a chip-enabled card, when executed, to perform a method in accordance with claim 1.

8. The computer program product of claim 7 wherein the chip-enabled card comprises at least one communication system configured to communicate with the merchant terminal and to communicate to the account holder device via a separate channel from a coupling between the chip-enabled card and the merchant terminal; and wherein the at least one processor is configured to communicate the alert via the separate channel.

9. A chip-enabled card comprising at least one processor, a memory and at least one communication system configured to communicate with a merchant terminal, in a contact or contactless manner, to conduct a transaction, the memory storing instructions and data to configure the processor to perform a method comprising:

receiving transaction data via the merchant terminal for performing an analysis of the transaction;

triggering an alert for communication to an account holder communication device associated with the chip-enabled card in response to the analysis of the transaction by the chip-enabled card using pre-set transaction processing rules, the alert requesting a response to confirm or deny the transaction; and processing authorization in accordance with the response or no response as received by the chip-enabled card.

10. The chip-enabled card of claim 9 wherein the at least one communication system is further configured to communicate to the account holder device via a separate channel from a coupling between the chip-enabled card and the merchant terminal and wherein the processor is configured to communicate the alert via the separate channel.

11. The chip-enabled card of claim 10 wherein the processor is configured to receive the response via the separate channel.

12. The chip-enabled card of claim 11 wherein the at least one communication system is configured to communicate with the account holder communication device via a wireless local area network or a wireless wide area network in the separate channel, without communicating through the merchant terminal.

13. The chip-enabled card of claim 9 wherein the processor is configured to provide a card analysis return code to the merchant terminal in accordance with the authorization and wherein the card analysis return code includes data representing the response or no response as received by the chip-enabled card.

14. The chip-enabled card of claim 9 wherein the pre-set transaction processing rules are stored to the chip-enabled card and wherein the processor is configured to receive updates to the pre-set transaction processing rules wherein at least some of the pre-set transaction processing rules are defined by an account holder associated with the chip-enabled card.

\* \* \* \* \*